US012397589B2

(12) United States Patent
Özüduru et al.

(10) Patent No.: US 12,397,589 B2
(45) Date of Patent: Aug. 26, 2025

(54) PNEUMATIC VEHICLE TIRE

(71) Applicant: Continental Reifen Deutschland GmbH, Hannover (DE)

(72) Inventors: Ahmet Özüduru, Hannover (DE); Eugen Henze, Wedemark (DE); Lubos Kuniak, Ladce (SK)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 18/572,062

(22) PCT Filed: Dec. 14, 2021

(86) PCT No.: PCT/DE2021/200260
§ 371 (c)(1),
(2) Date: Dec. 19, 2023

(87) PCT Pub. No.: WO2023/274437
PCT Pub. Date: Jan. 5, 2023

(65) Prior Publication Data
US 2024/0359509 A1     Oct. 31, 2024

(30) Foreign Application Priority Data
Jun. 28, 2021 (DE) .................. 10 2021 206 642.9

(51) Int. Cl.
*B60C 13/00*     (2006.01)
*B60C 13/02*     (2006.01)

(52) U.S. Cl.
CPC ............ *B60C 13/02* (2013.01); *B60C 13/001* (2013.01)

(58) Field of Classification Search
CPC ....... B60C 11/01; B60C 13/00; B60C 13/001; B60C 13/02
See application file for complete search history.

(56) References Cited

U.S. PATENT DOCUMENTS 3,482,616 A * 12/1969 French ................... B60C 13/02
                                              152/209.16
4,723,585 A * 2/1988 Mechtel ................. B60C 13/04
                                                  152/902

(Continued)

FOREIGN PATENT DOCUMENTS

| EP | 3129241 B1 | 6/2018 |
| EP | 3640057 A1 | 4/2020 |

(Continued)

OTHER PUBLICATIONS

English machine translation of JP2012-020672. (Year: 2012).*

(Continued)

*Primary Examiner* — Robert C Dye
(74) *Attorney, Agent, or Firm* — Richard A. Wolf; Gregory Adams

(57) ABSTRACT

A pneumatic vehicle tire having a tread, a belt assembly, a radial carcass, and having sidewalls which in each case in their radially outer region have at least two rows of parallelogram-shaped elevations with a height of 0.80 mm to 1.50 mm, determined in relation to the remaining level of the sidewall, said rows running so as to be concentric with the annular shape of the sidewall, wherein in which intermediate spaces are present between the elevations within one row and between mutually adjacent rows. The rows of elevations are mutually offset in the circumferential direction of the sidewall, with the elevations overlapping one another, wherein the intermediate spaces between the elevations are also mutually offset in the circumferential direction from row to row, so as not to be co-aligned.

18 Claims, 2 Drawing Sheets

(56) References Cited

U.S. PATENT DOCUMENTS

| | | | | |
|---|---|---|---|---|
| 2011/0126950 A1* | 6/2011 | Barton | ................... | B60C 11/01 |
| | | | | 152/209.11 |
| 2012/0227879 A1* | 9/2012 | Muhlhoff | ............. | B23K 26/355 |
| | | | | 152/151 |
| 2015/0165831 A1 | 6/2015 | Kodama | | |
| 2020/0171887 A1 | 6/2020 | Hayashi | | |

FOREIGN PATENT DOCUMENTS

| | | | |
|---|---|---|---|
| JP | 2911147 B2 | * | 6/1999 |
| JP | 2012020672 A | * | 2/2012 |
| JP | 2017144799 A | | 8/2017 |

OTHER PUBLICATIONS

The International Search Report and the Written Opinion of the International Searching Authority mailed on Mar. 14, 2022 for the PCT Application No. PCT/DE2021/200260.

* cited by examiner

PNEUMATIC VEHICLE TIRE

CROSS-REFERENCE TO RELATED APPLICATIONS

The present application is a National Stage Application under 35 U.S.C. § 371 of International Patent Application No. PCT/DE2021/200260 filed on Dec. 14, 2021, and claims priority from German Patent Application No. 10 2021 206 642.9 filed on Jun. 28, 2021, the disclosures of which are herein incorporated by reference in their entireties.

TECHNICAL FIELD

The invention relates to a pneumatic vehicle tire having a tread, a belt assembly, a radial carcass, and having sidewalls which in each case in their radially outer region have at least two rows of parallelogram-shaped elevations with a height of 0.80 mm to 1.50 mm, determined in relation to the remaining level of the sidewall, said rows running so as to be concentric with the annular shape of the sidewall, wherein intermediate spaces having in each case in particular constant widths are present between the elevations within one row and between mutually adjacent rows.

BACKGROUND

A pneumatic vehicle tire of this type is known, for example, from EP 3 129 241 B1. The sidewalls of the pneumatic vehicle tire in their radially outer region are reinforced with a protective layer of rubber, which locally thickens the sidewall and is divided by a network of incisions consisting of at least one circumferential incision in the circumferential direction of the sidewall and a plurality of incisions in block elements extending in the radial direction, therefore in elevations. The depth of the incisions at least in some regions is not more than 50% of the thickness of the protective layer at the point of the profile of the respective incision. In sidewalls which are provided with rubber protective layers in this manner, the risk of damage to the carcass insert running below the sidewalls, for example when the tire comes into contact with curbs and the like, is noticeably reduced. The narrow mesh ensures a great flexibility of the protective layer, which, however, comes at the expense of the robustness of the block-like structure.

SUMMARY

The invention is based on the object of increasing the robustness of the block-like structure in a pneumatic vehicle tire of the type mentioned above, without having to accept any loss of flexibility.

The object is achieved according to the invention in that the rows of elevations are mutually offset in the circumferential direction of the sidewall, with the elevations overlapping one another, wherein the intermediate spaces between elevations are also mutually offset in the circumferential direction from row to row, so as not to be co-aligned.

Due to the mutual offset, the individual elevations are structurally very robust, in particular due to the possibility of optimal mutual support as a result of the intermediate spaces which are mutually offset in the radial direction. These staggered intermediate spaces between the elevations in the individual rows still ensure a high degree of flexibility of the sidewall under loads.

In a preferred embodiment, the elevations in all rows when viewed from above have a parallelogram shape with two acute angles of 30° to 70° which the angles in the elevations match within a row and preferably in the elevations of all rows, wherein the elevations in all rows are identically aligned in the circumferential direction. An embodiment of this type facilitates the design and arrangement of the elevations with intermediate spaces between the rows, which are mutually offset in the circumferential direction without adjoining one another.

In another preferred embodiment, which moreover can be designed in a visually very appealing manner, the elevations in all rows are rectangular, in particular square, when viewed from above.

A particularly uniform distribution of the rubber material claimed by the elevations is achieved when all rows within a sidewall portion which extends in the circumferential direction have the same number of elevations. In this context, it is furthermore advantageous if the elevations in the rows within a sidewall portion which extends in the circumferential direction are each of identical design, and all of the elevations are preferably designed in the same manner.

Further advantageous design embodiments of the elevations enhance their robustness and their protective effect. According to one of these design embodiments, the elevations in the circumferential direction of the sidewall have a length of 15.00 mm to 30.00 mm, in particular of 20.00 mm, and furthermore in the radial direction have a width of 5.00 mm to 12.00 mm. When viewed from above, square elevations preferably have an edge length of 6.00 mm to 20.00 mm.

Furthermore, elevations that have lateral faces which run at an angle of 30° to 90°, in particular up to 60°, in relation to the level of the sidewall, are particularly robust in terms of deformations. At angles of less than 90°, the lateral faces are tilted outward.

The widths of the intermediate spaces between the elevations within a row are 1.00 to 7.00 mm, in particular at least 2.00 mm, and between adjacent rows are 1.00 to 5.00 mm, in particular at least 1.5 mm. Widths of this order are particularly advantageous for a good flexibility of the sidewall under the stresses occurring during the operation of the tires.

With a view to a good protective effect of the elevations when contacting curb edges and the like, a relatively large radial region of the sidewall should be covered by elevations. It is therefore advantageous if the number of rows is three to five, and if the rows on the sidewall cover a sidewall portion which in the radial direction is between a first height, which is 40% to 50% of the cross-sectional height of the tire, and a second height, which is between 80% and 97% of the cross-sectional height of the tire. In this respect, it is additionally advantageous if the rows run continuously over at least a major part of the circumference of the sidewall, in particular over at least three quarters of the circumference.

In order to moreover make the elevations and the intermediate spaces between the elevations visually appealing, in a preferred embodiment intermediate spaces between the elevations and between adjacent rows are provided with a crosshatch of a multiplicity of parallel micro-ribs with a preferably dome-shaped or triangular cross section and with a maximum height of 0.20 mm to 0.30 mm in relation to the sidewall level, and a likewise width at their base. Such micro-ribs can also run over surfaces of elevations, an extremely attractive design of the sidewall being achievable as a result.

BRIEF DESCRIPTION OF THE DRAWINGS

Further features, advantages and details of the invention will now be described in more detail on the basis of the schematic drawing, which illustrates exemplary embodiments. In the drawing.

DETAILED DESCRIPTION

Pneumatic vehicle tires embodied according to the invention are radial tires for motor vehicles, preferably tires for passenger motor vehicles, SUVs, vans or light trucks.

Figure 1:
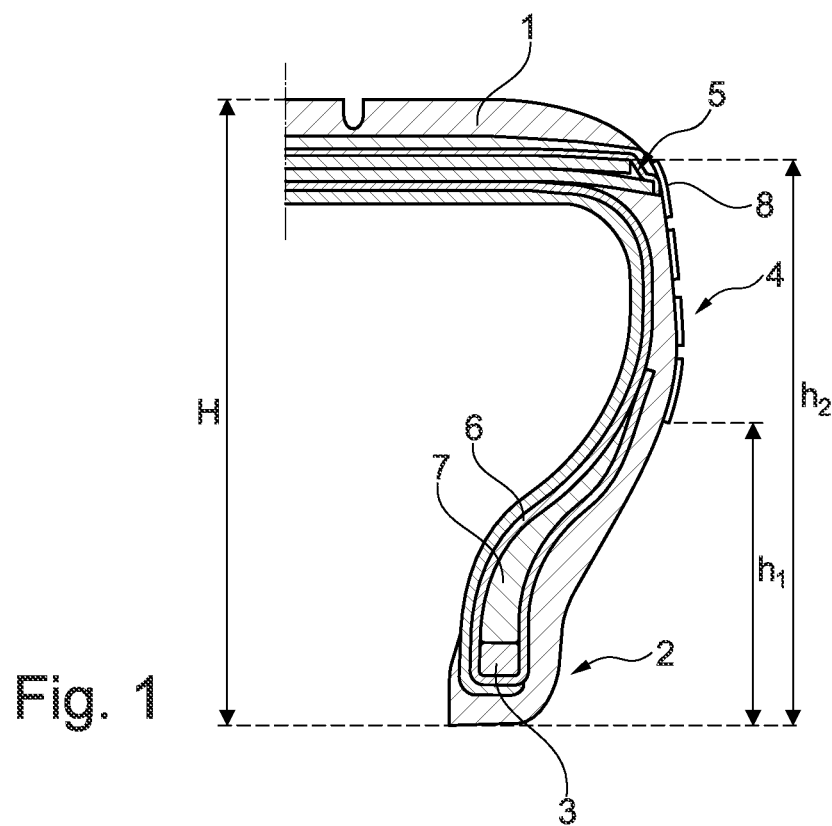
FIG. 1 shows a cross section of one half of a pneumatic vehicle tire.

The pneumatic vehicle tire shown in FIG. 1 has as substantial components a tread 1, which in a way not shown is provided with a tread profile, bead regions 2 with bead cores 3, sidewalls 4, a multi-layer belt assembly 5, and a carcass insert 6. Installed radially outside the bead core 3 is a core profile 7 which, conjointly with the bead core 3, encircles the tire.

The sidewalls 4 consist of a rubber material and run along the outside of the tire along the carcass insert 6, between the belt assembly 5 and the bead regions 2. In order to facilitate a low rolling resistance of the pneumatic vehicle tire by reducing weight, the sidewalls 4 are kept relatively thin. In the case of thin sidewalls 4, the risk that the carcass insert 6 is also damaged when contacting curb edges or the like is greater than in the case of thicker sidewalls.

Figure 2:
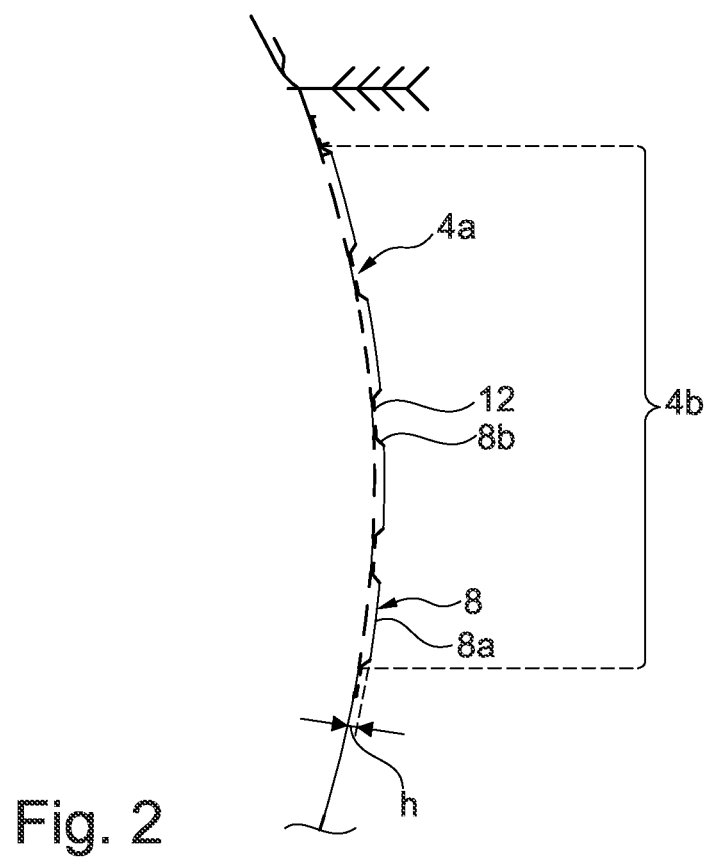
FIG. 2 shows an enlarged illustration of a fragment of the outer contour in the region of the sidewall of the pneumatic vehicle tire from FIG. 1.
Figure 3:
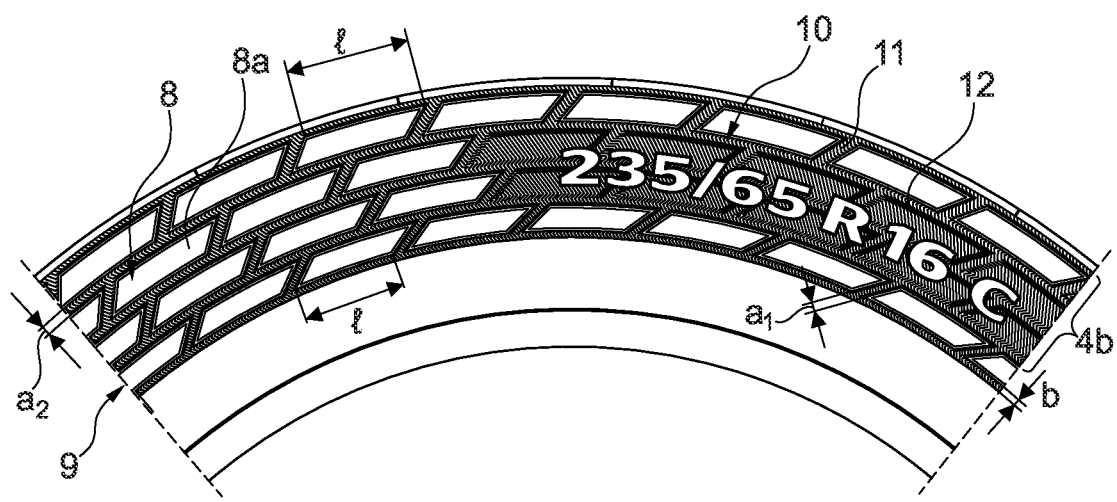
FIG. 3 shows a view of a circumferential portion of the sidewall having an embodiment of the invention.
Figure 4:
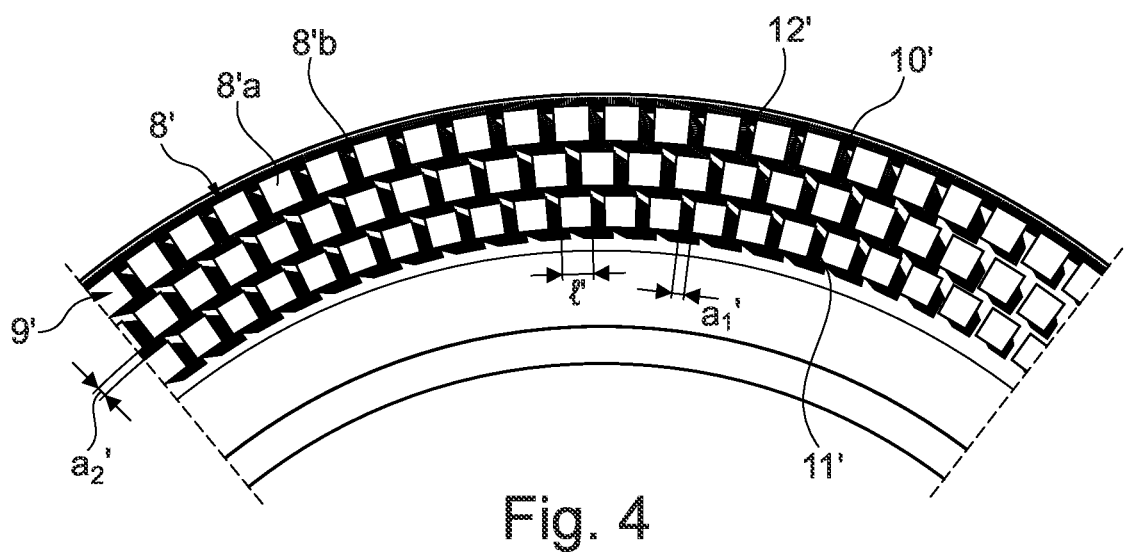
FIG. 4 shows a view of a circumferential portion of a sidewall having a further embodiment of the invention.

In order to make the sidewalls 4 more robust in relation to external influences, they are reinforced, as shown in particular in FIG. 3 and FIG. 4, with rows 9, 9' of block-shaped elevations 8, 8' which run in parallel and next to one another and protrude from the remaining sidewall level 4a (FIG. 2) and in relation to this level have a top face 8'a with a constant height h, the latter being 0.80 mm to 2.00 mm, in particular 1.00 mm. The elevations 8, 8' have lateral faces 8b, 8'b descending from the top face 8a, 8'a to the sidewall level 4a. In the embodiment according to FIG. 2 and FIG. 3, the lateral faces 8b are inclined at an angle of 30° to 60°, in particular 45°, in relation to the sidewall level 4a; in the embodiment according to FIG. 4, the lateral faces 8'b are inclined at an angle of 70° to 90° in relation to the sidewall level 4a. The rows 9, 9', the number of which is at least two and in particular up to five, follow concentrically the annular shape of the sidewall 4 and are therefore annular segments which run continuously within a wider sidewall portion 4b that comprises all of the rows 9, 9' and runs over the circumference of the sidewall 4, or part of the circumference, for example at least three quarters of the circumference.

As shown in particular in FIG. 1, the sidewall portion 4b covers a sidewall region in the radial direction between a first height $h_1$, which is 30% to 50% of the cross-sectional height H and a second height $h_2$, which is 80% to 97% of the cross-sectional height H.

In the preferred embodiment shown in FIG. 3 and FIG. 4, the number of elevations 8, 8' in rows 9, 9' is identical within a sidewall portion 4b, wherein elevations 8, 8' of identical size and identical design are preferably present in a parallelogram shape, when viewed from above, within each row 9, 9'.

FIG. 3 shows an embodiment having parallelogram-shaped elevations 8 with two acute angles from 30° to 70° and two corresponding obtuse angles, two longer sides which are slightly curved in the circumferential extent of the sidewall 4 and in accordance with the annular shape, having a length l of 15.00 mm to 30.00 mm, in particular at least 20.00 mm, determined along their chord, wherein the length l of the elevations 8 located within the radially innermost row 9 is less than the length l of the elevations 8 in the radially outermost row 9 and increases from the innermost to the outermost. The width b of the elevations 8, determined in the radial direction, is 5.00 mm to 12.00 mm, wherein the width b is identical in all or some rows 9, or increases from the radially innermost row 9 in the direction toward the radially outermost row 9.

Intermediate spaces 11 are located between the elevations 8 within the rows 9, the width $a_1$ of said intermediate spaces 11 at the sidewall level 4a being in the order of 1.00 mm to 5.00 mm, in particular at least 2.00 mm, and preferably being constant between the elevations 8 within a specific row 9. Also present between adjacent rows 9 are intermediate spaces 12, the width $a_2$ of which being 1.00 mm to 5.00 mm, in particular 2.00 mm to 5.00 mm, wherein the width $a_2$ can be increasingly larger the further radially outside a row 9 is located.

The mutual arrangement of the elevations 8 in the adjacent rows 9 is of such a type that they are mutually offset from row 9 to row 9 in the same circumferential direction over, for example, 25% to 50% of their lengths L and therefore overlap one other in such a manner that no co-aligned intermediate spaces 11 are present.

The intermediate spaces 11, 12 between the elevations 8 and between adjacent rows 9 in the preferred embodiment shown in FIG. 3 are provided with a crosshatch of parallel running micro-ribs 10 with a dome-shaped or triangular cross section, with a maximum height of 0.20 mm to 0.30 mm in relation to the other sidewall level 4a, and a likewise width at their base. These micro-ribs 10 can furthermore have a mutual spacing of 0.10 mm to 0.20 mm at their base. For design reasons, it can also be provided that micro-ribs 10 extend beyond the surfaces of the elevations 8. Additionally, a narrow, approximately 1.50 mm to 2.00 mm wide boundary strip can be provided radially within the radially innermost row 9 and radially outside the radially outermost row 9 with micro-ribs 10, as described. As shown in FIG. 3, an inscription of any characters can be configured as local additional elevations across one row 9 or across a plurality of rows 9.

Instead of the parallelogram shape with two acute and two obtuse angles when viewed from above, as illustrated and described, the elevations 8 may also have the shape of rhombs. Alternatively, the elevations have the shape of rectangles which are elongate in the circumferential direction.

FIG. 4 shows a design which, when viewed from above, has square elevations 8' with an edge length l' from 6.00 mm to 20.00 mm. The further radially inside the elevations 8' are, the smaller their edge length l'. The intermediate spaces 11', 12' between the elevations 8' have a width $a_1$' of 3.0 mm to 7.00 mm; the width $a_2$' between adjacent rows 9' is 1.5 mm to 5.00 mm. Intermediate spaces 11', 12' between elevations 8' are provided with a hatching of micro-ribs 10' running parallel to one another in such a manner that, when viewed onto the sidewall 4, the impression of cube-shaped elevations 8' is created. In this case, micro-ribs 10' can also run across surfaces of elevations 8'. The design of the micro-ribs 10' corresponds to that of the micro-ribs 10.

In another embodiment not shown, the number of elevations provided in one row differs from the number of elevations provided in at least one further row, for example in that one elevation is in each case present instead of the two elevations otherwise provided. The dimensions of the elevations and the intermediate spaces between them are mutually adapted in order to ensure mutual overlapping of the elevations from the adjacent rows.

LIST OF REFERENCE SIGNS

1 . . . Tread
2 . . . Bead region
3 . . . Bead core
4 . . . Sidewall
4$a$ . . . Sidewall level
4$b$ . . . Sidewall portion
5 . . . Belt assembly
6 . . . Radial carcass
7 . . . Core profile
8, 8' . . . Elevation
8$a$, 8'$a$ . . . Top face
8$b$, 8'$b$ . . . Lateral face
9, 9' . . . Row
10, 10' . . . Micro-rib
11, 12, 11', 12' . . . Intermediate space
$a_1, a_2, a_1', a_2', b$ . . . Width
H . . . Cross-sectional height
$h_1, h_2$ . . . Height
l . . . Length
l' . . . Edge length

The invention claimed is:

1. A pneumatic vehicle tire comprising a tread, a belt assembly, a radial carcass, and sidewalls, each sidewall in its radially outer region having rows of parallelogram-shaped elevations with a height of 0.80 mm to 1.50 mm, determined in relation to a remaining level of the sidewall, wherein the parallelogram-shaped elevations in each of the rows are arranged adjacent to one another in the circumferential direction, with each parallelogram-shaped elevation having opposite top and bottom sides running parallel to each other in the circumferential direction and defining a thickness therebetween, and each parallelogram-shaped elevation having opposite left and right sides running parallel to each other in a direction transverse to the circumferential direction and defining a width therebetween, wherein the rows of elevations are mutually adjacent to each other and run circumferentially so as to be concentric with each other in relation to an annular shape of the sidewall, wherein intermediate spaces are present between the adjacent elevations within each row to define respective column spaces, and the intermediate spaces are present between the elevations in the mutually adjacent rows to define respective row spaces, the elevations within each row being directly adjacent to each other with only the respective column spaces separating adjacent elevations in a row, and the elevations between rows being directly adjacent to each other with only the respective row spaces separating the elevations between rows;

wherein each elevation within its row has the same thickness, and the adjacent elevations within the row are radially co-aligned such that the top sides of all the elevations in the row run along the same circumference of the sidewall and the bottom sides of all the elevations in the row run along the same circumference of the sidewall, and the elevations between adjacent rows do not radially overlap such that the respective row spaces between the elevations of adjacent rows connect together form a continuously straight path in the circumferential direction along the sidewall; and wherein the elevations in one row are mutually offset in the circumferential direction with respect to the elevations in the mutually adjacent row, with the elevations in the mutually adjacent rows circumferentially overlapping one another, and the respective column spaces between elevations are also mutually offset in the circumferential direction from row to row, so as not to be co-aligned.

2. The pneumatic vehicle tire as claimed in claim 1, wherein the elevations in all rows when viewed from above have a rhomboid shape with the top and bottom sides being longer than the left and right sides, the rhomboid shape of the elevations being identical in all rows and having two acute angles of between 30° to 70°.

3. The pneumatic vehicle tire as claimed in claim 1, wherein the elevations in all rows are rectangular when viewed from above.

4. The pneumatic vehicle tire as claimed in claim 3, wherein, when viewed from above, the rectangular elevations are square elevations and have an edge length of 6.00 mm to 20.00 mm.

5. The pneumatic vehicle tire as claimed in claim 1, wherein all rows within a sidewall portion which extends in the circumferential direction have the same number of elevations.

6. The pneumatic vehicle tire as claimed in claim 1, wherein all of the elevations in all of the rows within a sidewall portion which extends in the circumferential direction are in each case of identical size and shape.

7. The pneumatic vehicle tire as claimed in claim 1, wherein the length of the elevations in the circumferential direction is from 15.00 mm to 30.00 mm, and in the width in the radial direction is from 5.00 mm to 12.00 mm.

8. The pneumatic vehicle tire as claimed in claim 1, wherein the elevations have lateral faces which run at an angle of 30° to 90° in relation to the level of the sidewall.

9. The pneumatic vehicle tire as claimed in claim 1, wherein the elevations have lateral faces which run at an angle of 30° to 60° in relation to the level of the sidewall.

10. The pneumatic vehicle tire as claimed in claim 1, wherein the widths of the column spaces between the elevations within a row are 1.00 to 7.00 mm, and the widths of the row spaces between adjacent rows are 1.00 to 5.00 mm.

11. The pneumatic vehicle tire as claimed in claim 1, wherein the widths of the intermediate spaces between the elevations within a row are 2.00 to 7.00 mm, and between adjacent rows are 1.50 to 5.00 mm.

12. The pneumatic vehicle tire as claimed in claim 1, wherein the number of rows is three to five, and the elevations in each row are progressively circumferentially offset from the radially innermost row to the radially outermost row.

13. The pneumatic vehicle tire as claimed in claim 1, wherein the rows on the sidewall cover a sidewall portion which in the radial direction extends between a first height, which is 40% to 50% of the cross-sectional height of the tire, and a second height, which is 80% to 97% of the cross-sectional height of the tire.

14. The pneumatic vehicle tire as claimed in claim 1, wherein the rows run continuously over at least a majority of the circumference of the sidewall.

15. The pneumatic vehicle tire as claimed in claim 1, wherein the rows run continuously over at least three quarters of the circumference of the sidewall.

16. The pneumatic vehicle tire as claimed in claim 1, wherein both the row spaces and the column spaces between elevations have micro-ribs, with a maximum height of 0.20 mm to 0.30 mm in relation to the sidewall level, and at least some elevations are devoid of micro-ribs on their outer surface.

17. The pneumatic vehicle tire as claimed in claim 16, wherein the micro-ribs are dome-shaped or triangular in cross-section and run parallel to each other.

18. The pneumatic vehicle tire as claimed in claim 16, wherein at least some other elevations have micro-ribs on their outer surface, the elevations with micro-ribs on their outer surface corresponding with a portion of the sidewall having lettering.

* * * * *